Patented Sept. 20, 1949

2,482,600

UNITED STATES PATENT OFFICE 2,482,600

HEAT-RESISTANT COMPOSITION

Donald V. Sarbach, Cuyahoga Falls, Ohio, assignor to The B. F. Goodrich Company, New York, N. Y., a corporation of New York No Drawing. Application June 21, 1947,
Serial No. 756,340

6 Claims. (Cl. 18—45)

This invention relates to a rubbery composition adapted to resist heat deterioration and the method of making same and is particularly concerned with a rubbery composition adapted for making vulcanized articles such as tire vulcanizing bags, steam hose, or the like which are subject to the deteriorating effect of hot air, hot water, steam, etc., and the preferred method of making same.

Ordinary vulcanized rubber compositions are seriously affected by prolonged heating, the physical properties of the rubber such as tensile strength, tear resistance, elasticity, etc., being reduced to a point where the rubber is not usable. The problem is especially serious when the rubber is exposed to superheated steam because the steam not only reduces the physical properties of the rubber but also causes it to blister and laminate. For example, a natural rubber article is seriously affected by exposure to steam at 200 p. s. i. in a period of two hours and is completely unusable in four hours. Synthetic rubber compositions compounded in accordance with conventional compounding techniques are also not suitable for prolonged use when exposed to hot air or hot water.

It is, therefore, an object of this invention to provide a rubbery composition having improved resistance to heat deterioration. Other objects will be apparent from the description which follows.

I have discovered that a suitable composition possessing excellent physical properties including greatly improved resistance to heat deterioration comprises a homogeneous blend of natural rubber, a rubbery polymer of 2-chlorobutadiene-1,3, and a rubbery copolymer of a butadiene-1,3 hydrocarbon with acrylonitrile blended in the proportions and manner herein set forth.

A vulcanized composition comprising natural rubber initially possesses excellent physical properties with the exception of heat resistance. Similarly polychloroprene and butadiene-acrylonitrile copolymers do not in themselves possess the desired resistance to heat aging. When a composition is prepared, however, comprising a homogeneous blend of rubbery material consisting of 50–90% by weight of natural rubber with 10–50% by weight of a mixture of polychloroprene and butadiene-acrylonitrile copolymer, the composition in the vulcanized state has a useful life under heat deteriorating conditions at least 800% longer than a conventional vulcanized composition containing any one of the rubbery components alone.

The polychloroprene is that rubbery material commonly known as neoprene and is the rubbery vulcanizable polymer of 2-chlorobutadiene-1,3 commonly known as chloroprene.

The butadiene-acrylonitrile copolymer used is any rubbery vulcanizable copolymer of these monomers and is preferably the copolymer of a butadiene-1,3 hydrocarbon such as, for example, butadiene-1,3; 2-methyl butadiene-1,3; 2,3-dimethyl butadiene-1,3; 2-ethyl butadiene-1,3 or similar monomer with a lesser amount by weight of acrylonitrile, particularly suitable copolymers being the 55:45 copolymer, the 67:33 copolymer and the 75:25 copolymer of these materials.

Butadiene-acrylonitrile copolymers normally do not blend well with natural rubber when used in amounts equal to or less than the weight of natural rubber. In a composition of this invention, however, it is necessary to have a homogeneous blend of the components to attain the desired physical properties. I have found that the desired homogeneity of the rubbery components is attained by first admixing the neoprene and the butadiene-acrylonitrile copolymer since the copolymer is compatible with the neoprene in all proportions. This neoprene-copolymer master batch may then be mixed with natuaral rubber to obtain a homogeneous system in which the rubbery material appears as a single phase. The processing characteristics of the resulting composition are comparable to those of a natural rubber composition.

The desirable physical properties of the natural rubber are retained in a composition in which the natural rubber amounts to 50–90% by weight of the total rubbery material present and the mixture of neoprene and butadiene-acrylonitrile copolymer constitutes the remainder of the rubbery material. The neoprene-copolymer mixture desirably consists of 25–75% by weight of neoprene with the remainder being the butadiene-acrylonitrile copolymer and optimum results are obtained using a 50:50 mixture of the two components. The neoprene-copolymer mixture gives greatly enhanced heat resistance in a composition in which the mixture amounts to as little as 10% by weight of the total rubbery material and the natural rubber amounts to 90% thereof. The neoprene-copolymer mixture and the natural rubber may be used, however, in varying proportions up to equal amounts by weight with optimum results being attained in a composition in which the neoprene-copolymer mixture amounts to 20% by weight of the rubbery material and the natural rubber forms the remaining 80% by weight thereof.

The compositions embodying this invention may contain in addition to the rubbery material any of the commonly used compounding ingredients for rubber, such as fillers, reinforcing agents, vulcanizing agents and accelerators therefor, softeners, antioxidants, etc. The composition is desirably vulcanized with 1–10% by weight of sulfur based on the total weight of rubbery material to give best heat resistance in combination with the other desirable physical properties. Compositions which are to be subjected to heat in the absence of appreciable amounts of moisture are preferably vulcanized with 1–3% by weight of sulfur based on the weight of rubbery material while compositions to be exposed to hot water or steam are preferably vulcanized with 3–10% by weight of sulfur. The composition also desirably contains at least 1% by weight of a basic metallic oxide such as zinc oxide to act as a vulcanizing agent for the neoprene although such basic oxide is not necessary in practicing the invention. Such oxide may be used in amounts up to 10% or more by weight of the total rubbery material. A composition prepared in accordance with this invention may be vulcanized in the usual manner as, for example, by heating at temperatures of 240° to 350° F. for 10 to 120 minutes.

A composition embodying this invention may be used in making a variety of articles including, for example, such articles as steam hose, high temperature gaskets, tire vulcanizing bags, etc., where the article is subjected to elevated temperatures for extended periods of time. The composition is particularly suitable for high temperature oil lines because the butadiene-acrylonitrile copolymer imparts oil resistance to the composition.

A few typical examples of compositions embodying the invention for use in making specific rubber articles will be included for purposes of illustration but it will be understood that the relative amounts of rubbery materials may be varied within the proportions defined in the appended claims and that the compounding ingredients may be varied both as to kind and amount in accordance with well known rubber compounding practice.

Example I

The following composition is typical of a composition eminently suited for use in making tire vulcanizing bags which are inserted inside unvulcanized tires and inflated with steam or hot water to furnish heat for vulcanization and to aid in forming the tire during vulcanization.

*Tire bag compound*

| Material | Parts by Weight |
| --- | --- |
| Natural rubber | 80.0 |
| Polychloroprene | 10.0 |
| Butadiene-acrylonitrile rubber (67:33 copolymer) | 10.0 |
| Clay | 90.0 |
| Zinc oxide | 5.0 |
| Phenylbetanaphthylamine | 2.0 |
| Sulfur | 6.5 |
| Benzothiazyl disulfide | 0.2 |
| Tetramethyl thiuram disulfide | 0.5 |
| Total | 204.2 |

The polychloroprene and the butadiene-acrylonitrile rubber are thoroughly mixed on a mill or in an internal mixer or by co-coagulation of the latices. The resulting blend is then mixed with the natural rubber until a homogeneous rubbery material is attained and the other ingredients are dispersed in the rubbery material by mixing on a mill or in an internal mixer. A homogeneous blend of the rubbers may be obtained alternatively by mixing the three different latices and co-coagulating them with the other ingredients being dispersed in the coagulum in the usual manner. The resulting vulcanizable composition is then extruded in the usual manner to form tube lengths which are spliced and provided with valves as in conventional tire vulcanizing bag construction. The assembled bags are then vulcanized by heating at 300° F. for 60 minutes.

The resulting vulcanized tire bags are flexible enough to be inserted into unvulcanized tires, possess sufficient strength to withstand prolonged pressures up to 200 p. s. i. or higher and remain unaffected by prolonged and repeated heating either by water or steam. For example, the above composition is unaffected by exposure to superheated steam at 200 p. s. i. for 16 hours while a similar composition in which all the rubber consisted of natural rubber began to seriously deteriorate in two hours and became completely unfit for use in four hours.

Example II

Conveyor belts are commonly employed for carrying heated metal articles or for conveying freshly painted articles through a high temperature dryer. A suitable recipe for a belt cover composition for use under such conditions is as follows:

*Belt cover composition*

| Material | Parts by Weight |
| --- | --- |
| Natural rubber | 60.0 |
| Polychloroprene | 15.0 |
| Butadiene-acrylonitrile rubber (55:45 copolymer) | 25.0 |
| Stearic acid | 4.0 |
| Pine tar | 2.0 |
| Zinc oxide | 10.0 |
| Carbon black | 40.0 |
| Aldol-alpha-naphthylamine | 2.0 |
| Sulfur | 1.5 |
| Benzothiazyl disulfide | 1.0 |
| Zinc dimethyl dithiocarbamate | 0.2 |
| Total | 160.7 |

In accordance with this invention the polychloroprene and the butadiene-acrylonitrile are mixed together and then added to the rubber, and the other compounding ingredients are dispersed therein as described hereinabove. This composition is then used as a cover stock in a conveyor belt built in accordance with common belt construction practices. Vulcanization is effected by heating at 287° F. for thirty minutes. The belt cover prepared in this manner has a service life at least 500% longer than that of a conventional belt cover under the same conditions.

Example III

A material suitable for making gaskets for use as a seal in a steam vulcanizer is shown by the following recipe.

*Gasket composition*

| Material | Parts by Weight |
| --- | --- |
| Natural rubber | 70.0 |
| Polychloroprene | 20.0 |
| Butadiene-acrylonitrile rubber (75:25 copolymer) | 10.0 |
| Stearic acid | 0.5 |
| Paraffin | 2.0 |
| Zinc oxide | 30.0 |
| Calcium silicate | 20.0 |
| Clay | 50.0 |
| Whiting | 20.0 |
| Sulfur | 5.0 |
| Trimethyl dihydroquinoline (polymerized) | 2.5 |
| 2-Mercaptobenzothiazole | 0.5 |
| Tetramethyl thiuram disulfide | 1.5 |
| Total | 232.0 |

The above composition is mixed in accordance with this invention. The gaskets are molded and vulcanized for 45 minutes at 270° F. The resulting gaskets are tear resistant, furnish excellent heat insulation and are resistant to deterioration by steam and hot water.

The invention has been described in considerable detail with reference to a few preferred embodiments of the invention and the method of making same, but it will be understood that other compositions and articles may be prepared and that further variations and modifications may be effected within the spirit and scope of the invention as defined in the appended claims.

I claim:

1. An unvulcanized rubbery composition vulcanizable to yield a material resistant to deterioration by hot air, said composition comprising a homogeneous blend of vulcanizable rubbery material consisting of 50–90% by weight of natural rubber and 10–50% by weight of a mixture consisting of 25–75% by weight of rubbery polychloroprene with the remainder being a rubbery copolymer of butadiene and acrylonitrile, and 1–3% by weight of sulfur based on the weight of rubbery material.

2. An unvulcanized rubbery composition vulcanizable to a condition resistant to steam deterioration, said composition comprising a homogeneous blend of vulcanizable rubbery material consisting of 50–90% by weight of natural rubber and 10–50% by weight of a mixture consisting of 25–75% by weight of rubbery polychloroprene with the remainder thereof being a rubbery copolymer of butadiene and acrylonitrile, and 3–10% by weight of sulfur based on the weight of rubbery material.

3. An unvulcanized vulcanizable rubbery composition comprising a homogeneous blend of vulcanizable rubbery material consisting of 50–90% by weight of natural rubber and 10–50% by weight of a mixture consisting of 25–75% by weight of rubbery polychloroprene with the remainder of said mixture being a rubbery copolymer of a butadiene-1,3 hydrocarbon and acrylonitrile, and 1–10% of sulfur based on the total weight of said rubbery material.

4. A vulcanized composition resistant to heat deterioration comprising rubbery material covulcanized with 1–10% of sulfur based on the weight of rubbery material, said rubbery material consisting of 50–90% by weight of natural rubber and 10–50% by weight of a mixture consisting of 25–75% by weight of rubbery polychloroprene with the remainder of said mixture being a rubbery copolymer of a butadiene-1,3 hydrocarbon and acrylonitrile.

5. The method of making a heat resistant article which comprises mixing unvulcanized rubbery polychloroprene with from one third to three times its weight of unvulcanized rubbery copolymer of a butadiene-1,3 hydrocarbon and acrylonitrile to give a homogeneous blend, mixing the resulting blend with from one to nine times its weight of natural rubber and with from 1–10% by weight of sulfur based on the total weight of the rubbery constituents, and thereafter covulcanizing the composition thus obtained.

6. A tire vulcanizing bag comprising a homogeneous blend of rubber materials covulcanized with 3–10% of sulfur based on the weight of said blend, said blend consisting of 50–90% by weight of natural rubber and 10–50% by weight of a mixture consisting of 25–75% by weight of rubbery polychloroprene with the remainder of said mixture being a rubbery copolymer of butadiene-1,3 and acrylonitrile.

DONALD V. SARBACH.

REFERENCES CITED

The following references are of record in the file of this patent:

UNITED STATES PATENTS

| Number | Name | Date |
| --- | --- | --- |
| 2,093,501 | Williams | Sept. 21, 1937 |
| 2,196,602 | Browne | Apr. 9, 1940 |
| 2,271,125 | Juve | Jan. 27, 1942 |
| 2,357,662 | Kemp | Sept. 5, 1944 |
| 2,392,902 | Crawford | Jan. 15, 1946 |

OTHER REFERENCES

Garvey et al., Ind. & Eng. Chem., Mar. 1944, pp. 209–211. "Perbunan Compounding and Processing," 2d edition pub. 1943 by Stanco Distributors, Inc., N. Y., pages 51 and 52.

Certificate of Correction

September 20, 1949

Patent No. 2,482,600

DONALD V. SARBACH

It is hereby certified that error appears in the printed specification of the above numbered patent requiring correction as follows:

Column 4, line 75, for "270° F." read *274° F.*;

and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*